(12) United States Patent
Shema et al.

(10) Patent No.: US 10,108,801 B2
(45) Date of Patent: Oct. 23, 2018

(54) WEB APPLICATION VULNERABILITY SCANNING

(71) Applicant: Qualys, Inc., Redwood Shores, CA (US)

(72) Inventors: Michael P. Shema, San Francisco, CA (US); Vaagn Toukharian, Redwood City, CA (US); Sergey Shekyan, Redwood City, CA (US)

(73) Assignee: Qualys, Inc., Foster City, CA (US)

( * ) Notice: Subject to any disclaimer, the term of this patent is extended or adjusted under 35 U.S.C. 154(b) by 0 days.

(21) Appl. No.: 13/678,099

(22) Filed: Nov. 15, 2012

(65) Prior Publication Data

US 2014/0137228 A1    May 15, 2014

(51) Int. Cl.
*G06F 21/57* (2013.01)
*H04L 29/08* (2006.01)

(52) U.S. Cl.
CPC ............ *G06F 21/577* (2013.01); *H04L 67/02* (2013.01)

(58) Field of Classification Search
CPC .............. G06F 11/3692; G06F 21/577; G06F 2221/033; H04L 63/1408; H04L 63/1433; H04L 63/1441; H04L 67/02
USPC ................................................ 726/11, 22, 25
See application file for complete search history.

(56) References Cited

U.S. PATENT DOCUMENTS

| | | | |
|---|---|---|---|
| 2003/0233581 A1* | 12/2003 | Reshef et al. | 713/201 |
| 2005/0251863 A1* | 11/2005 | Sima | G06F 21/577 726/25 |
| 2006/0059462 A1* | 3/2006 | Yamamoto | 717/115 |
| 2008/0120722 A1* | 5/2008 | Sima et al. | 726/25 |
| 2011/0153449 A1* | 6/2011 | Hite | G06Q 30/08 705/26.3 |
| 2011/0167494 A1* | 7/2011 | Bowen | G06F 21/566 726/24 |
| 2012/0072968 A1* | 3/2012 | Wysopal et al. | 726/1 |
| 2013/0191920 A1* | 7/2013 | Amit et al. | 726/25 |
| 2013/0227636 A1* | 8/2013 | Bettini et al. | 726/1 |
| 2013/0347094 A1* | 12/2013 | Bettini | H04L 63/0245 726/11 |

* cited by examiner

*Primary Examiner* — Joseph P Hirl
*Assistant Examiner* — Kalish Bell
(74) *Attorney, Agent, or Firm* — Baker & McKenzie LLP (57) ABSTRACT

Present example embodiments relate generally to scanning websites, wherein the devices, methods, and logic for the scanning comprises receiving interaction information between a user computing device and a web application of the website; dynamically determining an action to be performed to the web application that approximately simulates the user computing device interacting with the web application, wherein the action is dynamically determined based on the received interaction information; establishing a browsing session with the website; discovering the web application within the website; and identifying a vulnerability of the web application by interacting with the web application using the action.

37 Claims, 4 Drawing Sheets

WEB APPLICATION VULNERABILITY SCANNING

TECHNICAL FIELD

The present disclosure relates generally to methods, devices, and logic for use in scanning websites.

BACKGROUND

Web applications are typically developed using one or more programming languages, such as HTML, DHTML, XML, Java, JavaScript, and PHP. Web applications are executable through an application capable of displaying a website, such as a web browser, when a website visitor launches a website comprising the web applications. Web applications have become increasingly useful in enhancing user experiences to a website. Oftentimes, however, web applications can inadvertently create opportunities for malicious parties, viruses, worms, and the like, to introduce problems, security risks, and other vulnerable aspects (hereinafter collectively "vulnerabilities") to the proper operation and integrity of the website and/or its underlying servers, networks, etc.

To promote the broadest availability across multiple operating systems and browser platforms, web applications are typically designed to be executable in substantially the same manner regardless of a user's specific computing capabilities. As an example, a typical web application will be coded to enable execution on more than one type of web browser, such as the various different versions of Internet Explorer, Firefox, Safari, Netscape, Opera, etc., and using more than one type of computing device, such as a desktop computer, a laptop computer, a tablet, a smart phone, and the like.

A typical website will comprise a plurality of web applications ranging from simple web applications, such as basic JavaScript codes for performing textual or graphical renditions in response to user-initiated actions, to more complex and dynamic web applications, such as Web 2.0 Applications (or rich internet applications). Such web applications may communicate with one or more back-end database servers to search, retrieve, store, delete, and/or modify specific information after being triggered by one or more user-initiated actions. Such web applications can also communicate to and from one or more other types of servers, including third-party e-commerce servers or messaging servers.

Web applications are generally designed to be "dormant," or inactive, until a user performs one or more actions to the website, such as a mouse click and/or character input(s), that triggers one or more web applications to respond. Oftentimes, user-initiated actions can cause vulnerabilities, such as problems to the proper operation of the website and/or other vulnerabilities that can directly or indirectly affect the integrity of the user's computer, database servers, web servers, other back-end servers, other network elements, network communication channels, etc. In this regard, prudent website developers will perform reviewing and testing of their website and associated web applications (if possible) before going "live," that is, before the website is made available on the internet, intranet, or other computing networks. A cooperative cross-disciplinary effort of personnel, including developers, network/IT managers, website/security administrators, and/or compliance officers can also be established to plan, develop, and implement, among other things, web application security programs aimed at identifying and testing vulnerabilities of web applications within their live websites.

Web application scanners have recently been introduced as a tool used to identify vulnerabilities of web applications in a website. In general, a web application scanner will attempt to search, identify, and test (hereinafter collectively "scan" or "scanning") web applications by launching the website and actually interacting with web applications in a plurality of default ways, as pre-determined by the web application scanner. As a simple example, a web application scanner can perform a scan of an online search and/or submission form by submitting a plurality of predetermined permutations of different character inputs in hopes of triggering and identifying vulnerabilities. In such conventional approaches, web application scanners will typically take a predetermined "guessing" or trial-and-error approach to identifying web application problems and vulnerabilities. However, because a typical website might comprise hundreds or thousands of web applications, including complex and/or sequence-specific rich internet applications, it is recognized herein that such a "guessing" or trial-and-error approach to scanning websites can be very time and resource consuming, and ineffective.

Recent advances in web application scanners have attempted to address these problems by enabling the web application scanner user ("tester" or "security personnel") to manually select certain aspects/parts of their website to scan. In taking such a manual approach, web application scanners can be selectively applied to scan certain aspects/parts of the website using the same "guessing" or trial-and-error approach as described above. Security personnel are then enabled to divide the scanning of the website into separate scans, and are also enabled to perform targeted scanning so as to confirm tester-identified problems previously encountered in certain web applications and/or scanning of only new web applications.

Despite recent advances in web application scanners, including those described above, it is recognized herein that conventional web application scanners continue to be, among other things, ineffective, inefficient, and oftentimes even problematic in scanning websites, particularly those comprising complex, asynchronous, and/or sequence-specific web applications.

SUMMARY

Present example embodiments relate generally to systems, methods, devices, and computer-readable media for receiving/retrieving, discovering, analyzing, testing, and reporting of problems and/or vulnerabilities of target websites comprising one or more standalone web applications, one or more groups of web applications that respond to one or more common user-initiated, software-initiated and/or third party-initiated actions, one or more web applications that, either directly or indirectly, cause one or more other problems and/or vulnerable aspects in one or more web applications, and one or more web applications that require and/or are affected by maintaining and manipulating stored information and states.

In an exemplary embodiment, a method of scanning a website with a web scanner computing device comprises receiving information between a user computing device and a web application; dynamically determining an action to be performed upon the web application that approximately simulates the user computing device interacting with the web application, wherein the action is dynamically determined based on the received interaction information; establishing a browsing session with the website; discovering the web application within the website; and identifying a vulnerability of the web application by interacting with the web application using the dynamically determined action.

In another exemplary embodiment, a web scanner computing device for scanning a website is operable to receive information between a user computing device and a web application of the website; dynamically determine an action to be performed upon the web application that approximately simulates the user computing device interacting with the web application, wherein the action is dynamically determined based on the received interaction information; establish a browsing session with the website; discover the web application within the website; and identify a vulnerability of the web application by interacting with the web application using the dynamically determined action.

In another exemplary embodiment, logic embodied in a non-transitory computer-readable medium, the logic which, when executed, is operable to scan a website by receiving interaction information between a user computing device and a web application of the website; dynamically determining an action to be performed upon the web application that approximately simulates the user computing device interacting with the web application, wherein the action is dynamically determined based on the received interaction information; establishing a browsing session with the website; discovering the web application within the website; and identifying a vulnerability of the web application by interacting with the web application using the dynamically determined action.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and.

Although similar reference numbers may be used to refer to similar elements for convenience, it can be appreciated that each of the various example embodiments may be considered to be distinct variations.

DETAILED DESCRIPTION

Example embodiments will now be described hereinafter with reference to the accompanying drawings, which form a part hereof, and which illustrate example embodiments which may be practiced. As used in the disclosures and the appended claims, the terms "example embodiment," "exemplary embodiment," and "present embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

As described above, conventional web application scanners will first launch a website to be scanned (hereinafter "target website") and thereafter perform scanning of the web applications contained therein by "bombarding" the web applications with a plurality of "guesses" or trial-and-error approaches pre-programmed in the web application scanner. Such conventional scanning is performed mostly without any prior knowledge or understanding of the purpose of each web application and within the collective website as a whole, how the web applications have been designed to interact with actual typical users and/or other web application(s), and how typical users actually interact with the web applications and the collective website as a whole.

It is recognized herein that the above-described inherent problems of conventional web application scanners are a direct consequence of their inability to analyze and accurately perform "replaying" or "mimicking" of actual typical users of particular target websites. As a result, it is recognized herein that conventional scanners will inefficiently expend substantive amounts of time and resources in unnecessarily performing a plurality of predetermined "guesses" using, for example, a trial-and-error approach. Furthermore, it is recognized herein that conventional scanners will ineffectively search for, identify, and test, among other things, "false positives" and/or "false negatives" instead of actual vulnerabilities. As used herein, the term "false positives" will refer to those identified vulnerabilities that are not in fact actual vulnerabilities or would not be encountered by actual typical users of a website. Similarly, the term "false negatives" will refer to those actual vulnerabilities that are not found by conventional scanners and that in fact exist or would be encountered by actual typical users of a website. Furthermore, it is recognized herein that conventional scanners are largely ineffective in "replaying" or "mimicking" of actual typical users interacting with rich internet applications, including those that require specific user actions, sequences and/or values, maintaining states, and/or storing of values in cookies, or the like.

It is also recognized herein that conventional web application scanners oftentimes inadvertently cause problems and vulnerabilities to the very websites they are scanning. For example, as described above, because conventional scanning is performed mostly without any knowledge or understanding of the purpose and/or design of each web application and the collective website as a whole, and how typical users actually interact with the web applications and the website as a whole, conventional scanners will sequentially and/or concurrently "bombard" the target website with a plurality of predetermined "guesses" or trial-and-error interactions. One can readily see that, for a website comprising hundreds or thousands of web applications, such bombarding of the website will often result in undesirable and possibly even critical consequences to the integrity of the website. For example, conventional scanning might result in overwhelming the target website and underlying servers/network with web application scanner interaction requests; undesirably causing web applications to create/delete/amend a large number of entries in active databases; undesirably causing web applications to create a large number of new member accounts and/or send a large number of email/mail correspondences; causing web applications to trigger third-party systems to perform certain operations, such as causing third-party payment processing systems to unnecessarily flag a large number of false orders; unduly inflating website statistics and/or improperly inflating advertiser charges; slowing the responsiveness of the target website to actual visitors of the website; and/or potentially causing some or all of the target website to crash.

FIGS. 1-4 depict example embodiments of system 1 comprising web application scanner device 100 for accurately, efficiently, and effectively performing, among other things, receiving/retrieving 401, discovering 402, analyzing 403, testing 404, and reporting 405 across network 120 of problems and vulnerabilities of target websites. In an example embodiment, web application scanner device 100 comprises logic operable to, among other things, dynamically determine one or more actions or series of actions that simulate actual "typical users" as well as "exceptional users." Hereinafter, an actual typical user will generally refer to an actual user who attempts to interact with a website in a normal operating manner, as intended by the website developer, and generally within the confines to which the website was designed and expected to function. In contrast, an exceptional user will generally refer to a malicious user who interacts with a website in a manner that is not within the confines to which the website was designed and expected to function. It is to be understood herein that a typical user and an exceptional user might be one or more persons using one or more computing devices 110, such as a desktop or laptop computer, a tablet, a smart phone, or the like, and might also be one or more machine users, virtual machine users and/or software applications, such as computing devices, virtual machines and/or cloud computing technologies, configured to interact with a website.

Figure 1:
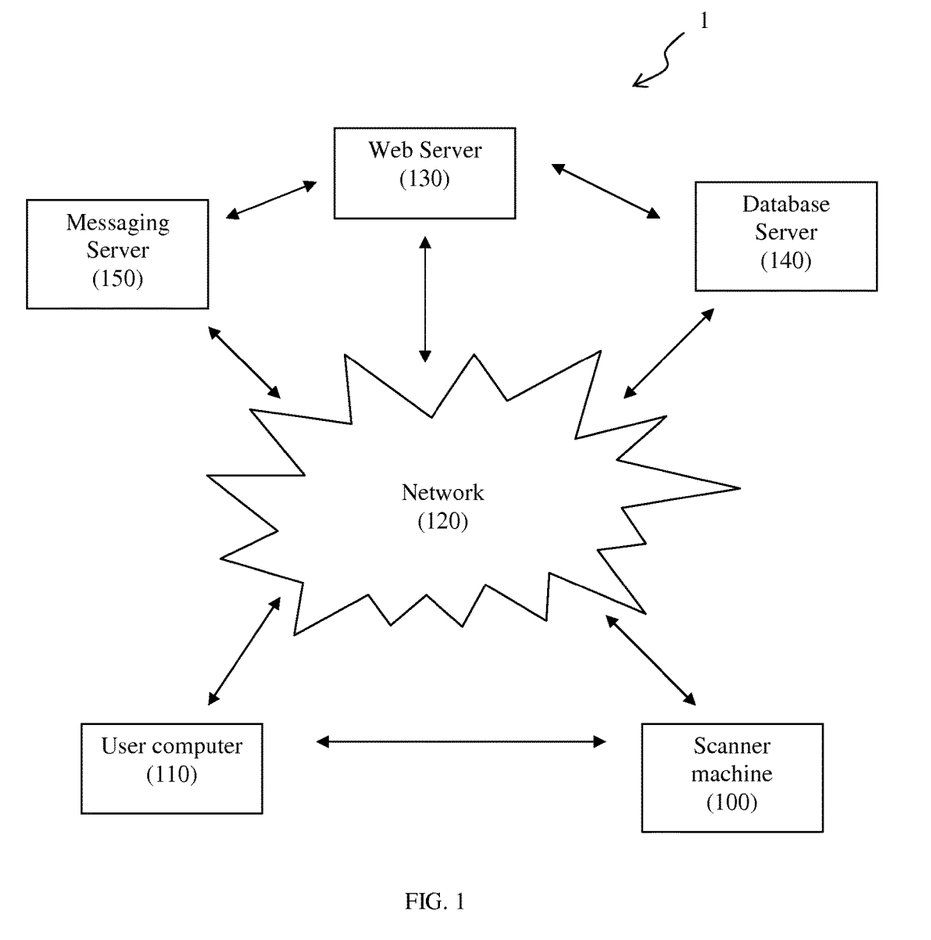
FIG. 1 is an illustration of an exemplary embodiment of a system for interacting with and scanning web applications.
Figure 2:
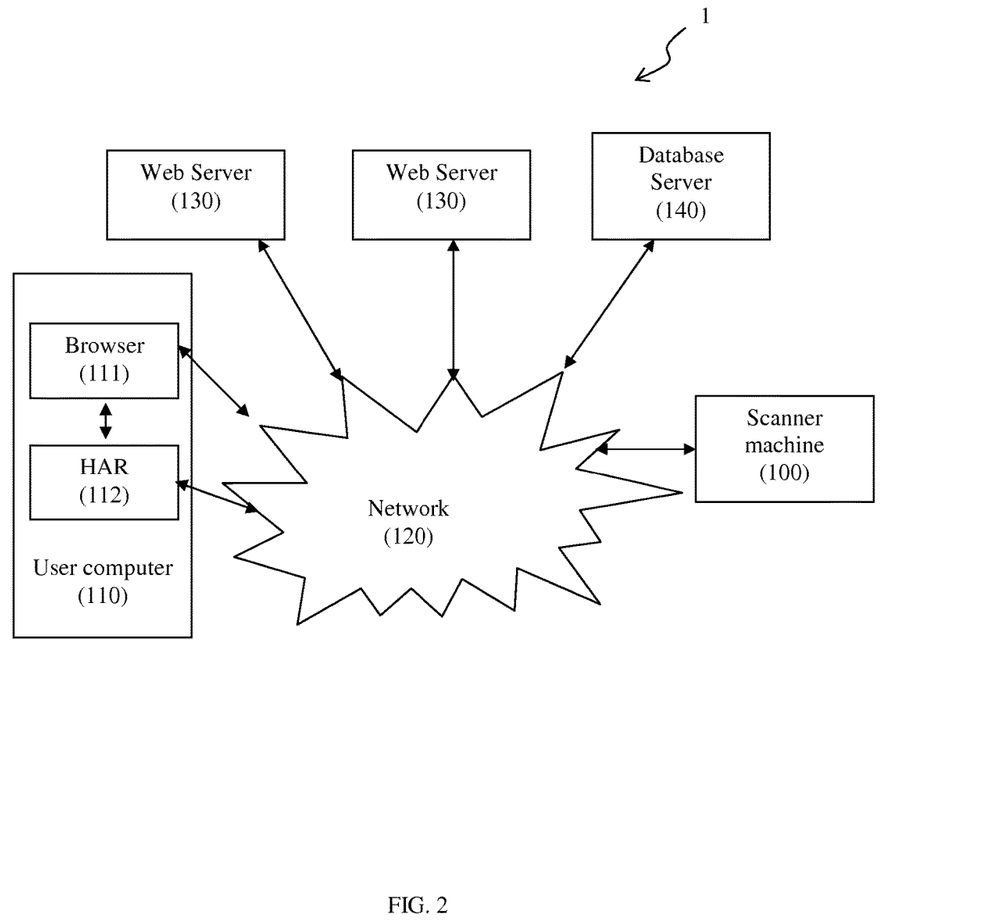
FIG. 2 is an illustration of an exemplary embodiment of a web application scanner device.
Figure 3:
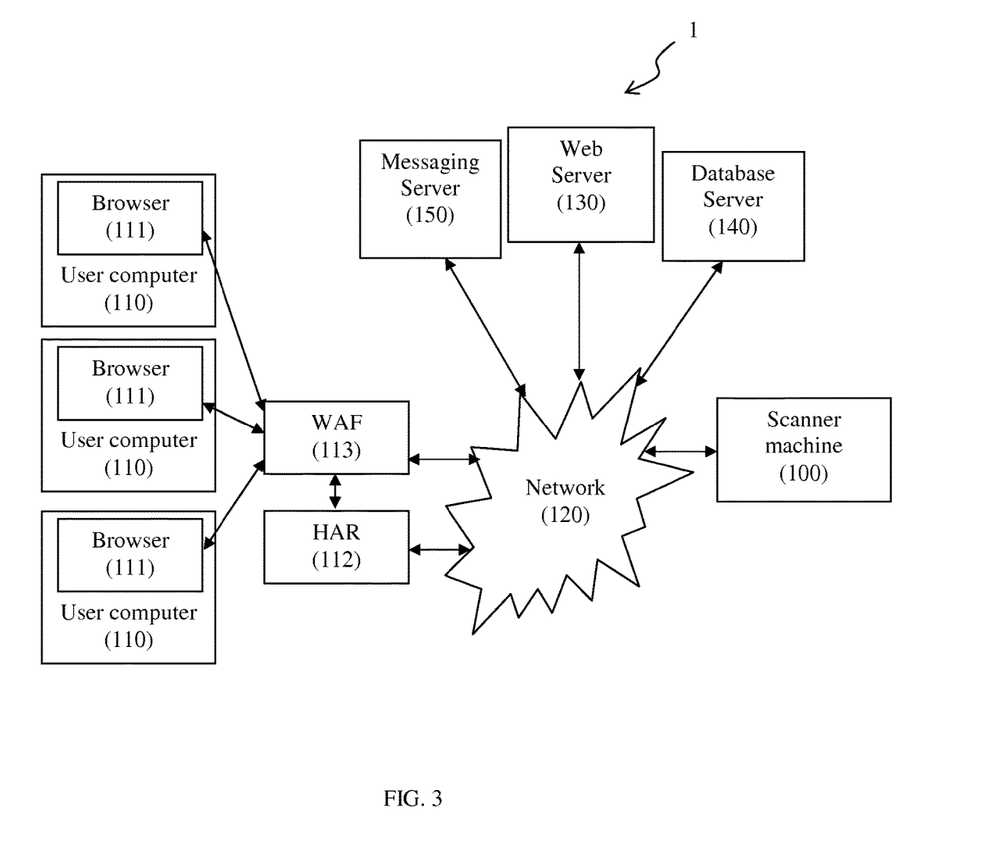
FIG. 3 is an illustration of an exemplary embodiment of a web application scanner device and a web application firewall (WAF)
Figure 4:
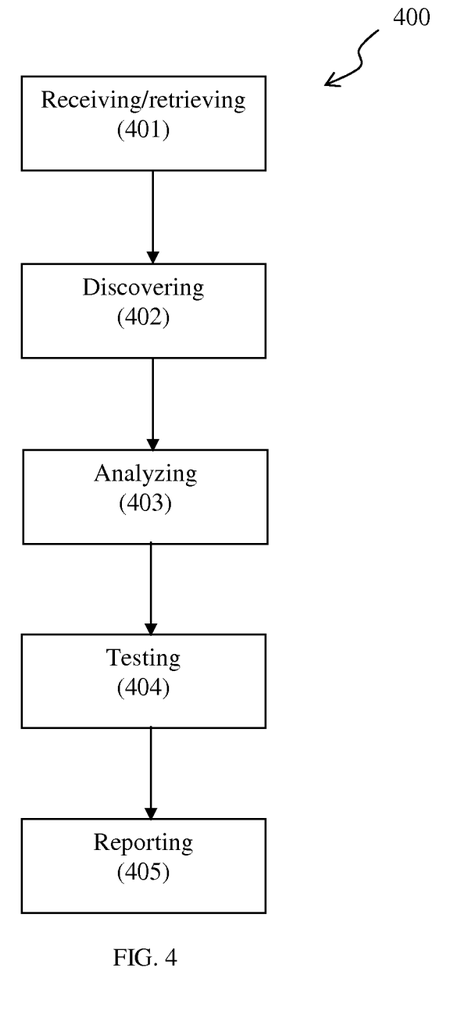
FIG. 4 is an exemplary embodiment of operations performable by web application scanner device.

Although shown in FIGS. 1-4 as a single element, scanner device 100 can represent one or more separate devices (including a part of or all of various different devices) and/or virtual machines that are operable to perform one or more of the respective operations illustrated in FIG. 4, including those pertaining to receiving/retrieving 401, discovering 402, analyzing 403, testing 404, and reporting 405. FIGS. 1-3 also depict user computer 110 in communication through network 120 to access target website hosted on one or more web servers 130. The target website might also be in communication with one or more other servers or network elements, such as database server 140 and messaging server 150.

Network 120 may represent any form of communication network between connected devices and any other network elements, and may also represent a collection of devices or virtual machines operable to provide cloud computing services to users. In an embodiment, scanner device 100 can also be in direct communication with one or more user computers 110 and/or other network elements, allowing scanner device 100 to perform tests by monitoring, commanding and/or manipulating one or more user actions and/or responses on one or more web applications. Network 120 can include routers, hubs, switches, firewalls, content switches, gateways, call controllers, and/or any other suitable components in any suitable form or arrangement. Network 120 can include, in whole or in part, one or more secured and/or encrypted Virtual Private Networks (VPNs) operable to couple one or more network elements together by operating or communicating over elements of a public or external communication network. In general, network 120 can include any combination of public or private communication equipment such as elements of the public switched telephone network (PSTN), a global computer network such as the internet, an intranet, a local area network (LAN), a wide area network (WAN), or other appropriate communication equipment. In an embodiment, the servers, the scanner device and/or the user computer may communicate through peer-to-peer (P2P) communications over the network. In some embodiments, network 120 might not be used at all if the components are located on the same device.

As described above, conventional web application scanners are inherently incapable of accurately "replaying" or "mimicking" the activities of typical users of a given target website due to, among other reasons, the inability of conventional web application scanners to obtain information on how actual users normally interact with particular web applications in particular target websites.

As depicted in FIG. 2, web application scanner device 100 is operable to receive and/or retrieve from one or more user's computers 110 a plurality of historic information pertaining to the user's activities, including request/respond pairs, with web applications in a particular target website. In an example embodiment, the information received/retrieved by web application scanner device 100 is information stored in an HTTP archive (HAR) file 112 stored in the user computers 110 and/or stored remotely. As it is understood by persons of ordinary skill in the art, files such as HAR files capture actual information flow, including user actions, sequences, and/or values, to/from browser 111 pertaining to user interactions with web applications in particular target websites. It is to be understood herein that web application scanner device 100 is operable to receive/retrieve information stored in files, such as HAR files 112, in a plurality of ways, including requesting permission from the typical user and scheduled information retrievals. It is also to be understood herein that other methods of receiving, retrieving, or capturing information pertaining to actual user interactions with web applications in target websites are also contemplated as equivalents to the example embodiments described herein, including receiving/retrieving information from file types other than HAR files and files located remotely from the user computer 110. An example of the latter is illustrated in FIG. 3, wherein user HAR files are located remotely at or behind a Web Application Firewall (WAF) 113, or the like.

Web application scanner 100 is operable to utilize the received/retrieved user interaction information 112, such as those logged in HAR files, to dynamically determine, among other things, the various ways in which typical users interact with web applications within the target website and the collective target website as a whole. It is realized herein that the said number of ways in which typical users interact with web applications, as received/retrieved by example embodiments, is generally significantly less than the number of ways in which conventional web application scanners "bombard" web applications in target websites. It is also to be understood herein that web application scanner 100 can perform the receiving/retrieving of user interaction information from more than one HAR file 112 of user computer 110, HAR files 112 of one or more user computers 110, and such receiving/retrieving can be performed continuously, periodically, upon a certain event occurring (such as when or after a typical user visits the target website), and/or at scheduled times. Upon analyzing the received/retrieved user interaction information, it is recognized herein that web application scanner 100 is operable to dynamically determine one or more actions or series of actions that simulate actual typical users so as to perform scanning of target websites with significantly improved accuracy, efficiency, effectiveness, and without unduly introducing problems and vulnerabilities to the target websites. More specifically, web application scanner 100 comprises logic operable to create and implement customized scanning of particular web applications based on the received/retrieved user interaction information, including actual user actions, sequences and/or values, for that particular target website. In example embodiments wherein the received/retrieved user interaction information from a plurality of different user computers 110 comprises different actions, sequences, and/or values for a particular target website, web application scanner 100 is operable to create and implement a plurality of customized scanning procedures for that particular website based on the received/retrieved user interaction information. It is to be understood herein that, whereas conventional web application scanners perform a large number of different default interactions with the target website based on "guessing" or trial-and-error, example embodiments are operable to perform specific sets of actual typical user interactions that are each customized to the particular target website based on retrieved user interaction information from files 112 such as HAR files.

An example embodiment is operable to identify problems and vulnerabilities for target websites comprising one or more standalone web applications; one or more collective groups of web applications that respond to one or more common actions; one or more web applications that trigger one or more other problems and/or vulnerabilities in one or more web applications; and one or more web applications that require maintaining and/or manipulating stored information and/or states, such as those stored in cookies, and the like. Possible actions include user-initiated actions, software-initiated actions, third party-initiated actions, and the like. User-initiated actions may include those performable by a typical user and/or exceptional user of the target website. Software-initiated actions may include those automated, semi-automated, and/or manual actions performable by software applications. Software applications may include those integrated within web browsers, such as browser add-ons, and/or those capable of communicating with web browsers, either locally from a user computer or network and/or from a remote location. Third party-initiated actions may include one or more of user-initiated actions, software-initiated actions, actions performable by third parties onto or while a typical or exceptional user is interacting with the target website, and a combination of one or more of these. As used herein, user-initiated actions, software-initiated actions, third party-initiated actions, and equivalents thereof, will be collectively referred to as "user actions."

After receiving/retrieving the user interaction information from one or more files 112, such as HAR files, an example embodiment of scanner device 100 is operable to analyze the information and perform customized scanning of the target website hosted by one or more web servers 130, which may also be in communication with one or more other servers 140, 150 or network elements. During each scan, scanner device 100 is operable to interact and subsequently identify those specific typical user interactions, including specific actions, sequences, and/or values, that do not result in problems or vulnerabilities. An example embodiment of scanner device 100 will then "learn" which of the specific typical user interactions to specific web application(s) of the particular target website do not result in problems or vulnerabilities. That is, scanner device 100 will identify those specific web applications as being "already tested" and "remember" not to perform scanning with those specific typical user interactions to those specific web applications in future scans of the particular target website. For example, as illustrated in FIG. 4, testing operation 404 may be bypassed 403B if scanner device 100 has already scanned the particular web application(s) and found no vulnerabilities. However, if scanner device 100 has not yet scanned the particular web application(s) and/or previously scanned and found vulnerabilities, then scanner device 100 will proceed 403A from the analyzing operation 403 to the testing operation 404. Example embodiments of scanner device 100 are also operable to apply what has been "learned" from particular target websites and/or web applications, including problems or vulnerabilities and lack thereof, to other target websites and/or web applications having similar or substantially the same web application(s) and user actions, sequences, and/or values. It is recognized herein that improved efficiency, as well as accuracy and effectiveness of scanning, is achievable in example embodiments, and without inadvertently causing problems and/or vulnerabilities to the very target website being scanned.

In the example embodiment depicted in FIG. 4, scanner device comprises logic operable to perform several operations, in sequence or in parallel, including those pertaining to receiving/retrieving 401, discovering 402, analyzing 403, testing 404, and reporting 405. In some embodiments, one or more of these operations may be combinable into one or more other operations, further divisible into other operations and/or performed in a different sequence. One or more of these operations may also be performable using software applications, virtual machines, cloud computing technologies, or the like, thereby providing, among other things, scalability and enabling testers to utilize the scanner device irrespective of the location and/or computing device.

As described above, scanner device 100 is operable to perform receiving/retrieving 401 of actual typical user interaction information from certain files 112, such as HAR files. These files may be located on user computers 110, as depicted in FIG. 2, and/or at a remote location such as in or behind a web application firewall (WAF) 113, as depicted in FIG. 3.

When performing the discovering operation 402, an example embodiment of scanner device 100 is operable to search for and identify web applications in the target website and make this information available, such as in a secured manner, for performing subsequent operations, including those pertaining to analyzing 403, testing 404, and reporting 405. In some embodiments, the discovering operation 402 may be performed before or at about the same time as the receiving/retrieving operation 401.

In the analyzing 403 and testing 404 operations, an example embodiment of scanner device 100 further identifies, selectively groups (if necessary), analyzes, and tests those identified web applications that may be navigable and capable of being manipulated by actual typical users, as determined from the discovering operation 402 and based on the received/retrieved information in receiving/retrieving operation 401. Scanner device 100 performs these operations based on whether the web applications are standalone web applications; web applications that respond cooperatively or collectively, either in parallel or in sequence, to one or more actual typical user actions; web applications that trigger one or more other problems and/or vulnerabilities in one or more web applications; or web applications that require or are affected by establishing, maintaining and/or manipulating of stored information and/or states, such as those stored in cookies, or the like. It is to be understood herein that scanner device 100 may also identify, selectively group, test, and/or analyze web applications based on other characteristics, grouping criterion, and/or situations, and equivalents thereof, in example embodiments.

In an example standalone testing embodiment, the scanner device 100 may perform "replaying" or "mimicking" of typical users interacting with web applications identified in the discovery operation 402 by interacting with the web applications based on the actual typical user actions, sequences, and/or values analyzed in the analyzing operation 403, including those described above, and equivalents thereof. For example, scanner device 100 may interact with a standalone web application by applying a plurality of different variations and combinations of actual typical user actions, sequences, and/or values. Such web applications may include rich internet applications (RIA), interactive forms, changes to what is being rendered, or the like. In interacting based on actual typical user actions, sequences, and/or values, scanner device 100 is operable to assess the plurality of actual typical user actions that may cause the target website to respond in a manner not intended by the software developer, and without having to expend unnecessary time and resources in "guessing" or performing trial-and-error (as in conventional approaches). In performing such standalone testing, scanner device 100 is not only enabled to provide the security personnel with an assessment of the effects of actual typical user actions, sequences, and/or values, but also a comprehensive report of the different actions, sequences, and/or values that can reproduce each of the problems and/or vulnerable aspects of the web application.

In an example cooperative testing embodiment, scanner device 100 performs selective groupings of those web applications identified in the discovering operation 402 and analyzing operation 403 that cooperatively or collectively, either in parallel or in sequence, respond to one or more actual typical user actions based on the information received/retrieved in the receiving/retrieving operation 401. Such selective groupings may be achievable in example embodiments by analyzing one or more of the above standalone test results and/or those of other example testing embodiments described herein, and equivalents thereof. Example embodiments may also perform such selective groupings before, in parallel and/or in sequence, and/or without use of such test results.

Thereafter, an example embodiment of scanner device 100 may create a "replaying" or "mimicking" of typical users interacting with each web application group by interacting with each group based on the actual typical user actions, sequences, and/or values analyzed in the analyzing operation 403, including those described herein, and equivalents thereof. For example, scanner device 100 may interact with a selected group of web applications that respond to one or more actual typical user actions by applying a plurality of different variations and combinations of actual typical user actions, sequences, and/or values. Such group of web applications may include rich internet applications (RIA), interactive forms, changes to what is being rendered, or the like. In interacting based on actual typical user actions, sequences, and/or values, scanner devices 100, 200 are operable to assess the plurality of actual typical user actions that can cause the target website to respond in a manner not intended by the software developer, and without having to expend unnecessary time and resources in "guessing" or performing trial-and-error (as in conventional approaches). It is recognized herein that example embodiments of the scanner devices 100, 200 are operable to provide the security personnel with an assessment of how actual typical user actions, sequences, and/or values can cause a plurality of web applications to collectively or cooperatively, either in parallel or in sequence, respond in a problematic and/or vulnerable manner.

In example embodiments, scanner device 100 is operable to perform cooperative testing by, among other things, generating, maintaining, monitoring and/or manipulating "states" during a browsing session and/or information stored within user-side and/or server-side cookies, or the like. In other words, scanner device 100 is operable to comprehensively "replay" or "mimic" typical user actions, sequences, and/or values based on the analyzed information in analyzing operation 403 and information stored in cookies by performing "replaying" or "mimicking" of typical users interacting in a plurality of cooperative scenarios, such as those described in example embodiments herein, and equivalents thereof. Such scenarios may include web applications that are standalone web applications, web applications that cooperatively or collectively respond to one or more actual typical user actions, web applications that interact, either in parallel or in sequence, with one another, and the like.

For example, scanner device 100 may interact with information stored in one or more cookies either intrusively or by applying a plurality of different variations and combinations of actual typical user inputs, as analyzed in analyzing operation 403, to one or more navigable web applications. Such web applications may include static or dynamic forms, database instructions embedded in hyperlinks, or the like. In interacting with such web applications that require and/or are affected by information stored in cookies, or the like, scanner device 100 is operable to assess the plurality of different actual typical user interactions, sequences, and/or values that can cause the target website to respond in a manner not intended by the software developer.

In performing these tests while establishing, maintaining, monitoring and/or manipulating states, cookies, sequences, values, or the like, an example embodiment of scanner device 100 is operable to provide the security personnel with accurate, efficient, and effective assessments of the target website, and without inadvertently introducing problems or vulnerabilities to the target website.

While various embodiments in accordance with the disclosed principles have been described above, it should be understood that they have been presented by way of example only, and are not limiting. Thus, the breadth and scope of the example embodiments described herein should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, as referred to herein, a device or engine may be a virtual machine, computer, node, instance, host, or device in a networked computing environment. Also as referred to herein, a networked computing environment is a collection of devices connected by communication channels that facilitate communications between devices and allow devices to share resources. Also as referred to herein, a server is a device deployed to execute a program operating as a socket listener and may include software instances.

Resources may encompass any type of resource for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include but is not limited to computing grid systems, distributed computing environments, cloud computing environment, etc. Such networked computing environments include hardware and software infrastructures configured to form a virtual organization comprised of multiple resources that may be in geographically disperse locations.

While TCP/IP communication protocols may be described herein, the coverage of the present application and any patents issuing there from may extend to other communications protocols.

Various terms used herein have special meanings within the present technical field. Whether a particular term should be construed as such a "term of art" depends on the context in which that term is used. "Connected to," "in communication with," "associated with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method comprising:
   logging, interaction information associated with a first target website, in at least one hypertext transfer protocol (HTTP) archive (HAR) file;
   receiving, by a web scanner computing device, the interaction information, wherein the interaction information, logged in the at least one HAR file, comprises interaction information, between a web application firewall (WAF) and web applications within the first target website hosted by one or more web servers;
   discovering, by the web scanner computing device, first and second web applications associated with the first target website;
   analyzing, by the web scanner computing device and based on the received interaction information, between the WAF and the web applications within the first target website logged in the at least one HAR file, the first and the second web applications associated with the first target website;
   identifying, by the web scanner computing device and based on the received interaction information, between the WAF and the web applications within the first target website logged in the at least one HAR file, one or more user interactions, with the first and the second web applications associated with the first target website, that do not result in problems or vulnerabilities;
   determining, by the web scanner computing device and based on analyzing the received interaction information, between the WAF and the web applications within the first target website, logged in the at least one HAR file, that the first and the second web applications cooperatively or collectively respond to a first interaction performed on the first target website;
   selectively grouping, by the web scanner computing device and based on determining that the first and the second web applications cooperatively or collectively respond to the first interaction, the first and the second web applications to form a web application group;
   dynamically determining, by the web scanner computing device and based on analyzing the received interaction information, between the WAF and the web applications within the first target website, logged in the at least one HAR file, a second interaction that, when performed by the web application group, causes the first target website to respond in an unintended manner; and
   scanning, by the web scanner computing device, a second target website by performing the second interaction on the second target website, wherein the second target website is associated with third and fourth web applications, wherein the scanning the second target website comprises:
      identifying the third and the fourth web applications, associated with the second target website, as being similar or substantially the same web applications as at least one of the first and the second web applications associated with the first target website;
      avoiding scanning the third and the fourth web applications, associated with the second target website, with the one or more user interactions; and
      avoiding scanning the third and the fourth web applications, associated with the second target website, with the second interaction when scanning the second target website, if the first and the second web applications associated with the first target website are identified as already scanned.

2. The method of claim 1, wherein the first interaction is customized for the first target website based on the interaction information logged in the at least one HAR file.

3. The method of claim 1, wherein the interaction information is associated with one or more interactions or sequences of interactions performed with respect to the first target website by one or more user computing devices.

4. The method of claim 1, wherein the web scanner computing device selectively groups the first and the second web applications to form the web application group before dynamically determining the second interaction.

5. The method of claim 1, wherein the web scanner computing device receives the interaction information before discovering the first and the second web applications.

6. The method of claim 1, wherein the web scanner computing device discovers the first and the second web applications before dynamically determining the second interaction.

7. The method of claim 1, wherein the interaction information is received from a plurality of user computing devices.

8. The method of claim 1, wherein the interaction information is provided in a secure environment for analysis by the web scanner computing device.

9. The method of claim 1, wherein at least one of the first interaction and the second interaction comprises at least one of a user action, a sequence of user actions, and a value.

10. The method of claim 1, wherein the scanning of the second target website is customized based on the second interaction.

11. The method of claim 1, wherein at least one of the receiving, discovering, or analyzing steps is performed by a virtual machine.

12. The method of claim 9, wherein the at least one of the first interaction or the second interaction comprises the user action, and wherein the user action comprises a third party-initiated action, wherein the third party-initiated action comprises an action performed by a third party while a user is interacting with at least one of the first target website or the second target website.

13. The method of claim 1, wherein the at least one file is located on the WAF.

14. The method of claim 1, wherein the at least one file is located in an external storage in communication with the WAF.

15. The method of claim 1, wherein the receiving the interaction information associated with the first target website is performed continuously, periodically, upon an event occurring, and/or at scheduled times.

16. A web scanner computing device operable to:
log, interaction information associated with a first target website, in at least one hypertext transfer protocol (HTTP) archive (HAR) file;
receive the interaction information, wherein the interaction information, logged in the at least one HAR file, comprises interaction information between a web application firewall (WAF) and web applications within the first target website hosted by one or more web servers;
discover first and second web applications associated with the first target website;
analyze, based on the received interaction information, between the WAF and the web applications within the first target website, logged in the at least one HAR file, the first and the second web applications associated with the first target website;
identify, based on the received interaction information, between the WAF and the web applications within the first target website, logged in the at least one HAR file, one or more user interactions, with the first and the second web applications, associated with the first target website;
determine, based on analyzing the received interaction information, between the WAF and the web applications within the first target website, logged in the at least one HAR file, that the first and the second web applications cooperatively or collectively respond to a first interaction performed on the first target website;
selectively group, based on determining that the first and the second web applications cooperatively or collectively respond to the first interaction, the first and the second web applications to form a web application group;
dynamically determine, based on analyzing the received interaction information, between the WAF and the web applications within the first target website, logged in the at least one HAR file, a second interaction that, when performed by the web application group, causes the first target website to respond in an unintended manner; and
scan a second target web site by performing the second interaction on the second target website, wherein the second target website is associated with third and fourth web applications, wherein the web scanner computing device being operable to scan the second target website comprises the web scanner computing device being operable to:
identify the third and the fourth web applications, associated with the second target website, as being similar or substantially the same web applications as at least one of the first and the second web applications associated with the first target website;
avoid scanning the third and the fourth web applications, associated with the second target website, with the one or more user interactions; and
avoid scanning the third and the fourth web applications, associated with the second target website, with the second interaction when scanning the second target website, if the first and the second web applications associated with the first target website are identified as already scanned.

17. The web scanner computing device of claim 16, wherein the interaction information is associated with one or more interactions or sequences of interactions performed with respect to the first target website by one or more user computing devices.

18. The web scanner computing device of claim 16, wherein the web scanner computing device selectively groups the first and the second web applications to form the web application group before dynamically determining the second interaction.

19. The web scanner computing device of claim 16, wherein the web scanner computing device receives the interaction information before discovering the first and the second web applications.

20. The web scanner computing device of claim 16, wherein the web scanner computing device discovers the first and the second web applications before dynamically determining the second interaction.

21. The web scanner computing device of claim 16, wherein the interaction information is received from a plurality of user computing devices.

22. The web scanner computing device of claim 16, wherein the interaction information is provided in a secure environment for analysis by the web scanner computing device.

23. The web scanner computing device of claim 16, wherein at least one of the first interaction and the second interaction comprises at least one of a user action, a sequence of user actions, and a value.

24. The web scanner computing device of claim 16, wherein the receiving the interaction information associated with the first target website is performed continuously, periodically, upon an event occurring, and/or at scheduled times.

25. The web scanner computing device of claim 16, wherein the first interaction is customized for the first target website based on the interaction information logged in the at least one HAR file.

26. The web scanner computing device of claim 16, wherein the scanning of the second target website is customized based on the second interaction.

27. A non-transitory computer-readable medium comprising code, wherein the code, when executed by at least one processing device of a web scanner computing device, causes the web scanning computing device to:
   log, interaction information associated with a first target website, in at least one hypertext transfer protocol (HTTP) archive (HAR) file;
   receive the interaction information, wherein the interaction information, logged in the at least one HAR file, comprises interaction information between a web application firewall (WAF) and web applications within the first target website hosted by one or more web servers;
   discover first and second web applications associated with the first target website;
   analyze, based on the received interaction information, between the WAF and the web applications within the first target website, logged in the at least one HAR file, the first and the second web applications associated with the first target website;
   identify, based on the received interaction information, between the WAF and the web applications within the first target website, logged in the at least one HAR file, one or more user interactions with the first and the second web applications associated with the first target website;
   determine, based on analyzing the received interaction information, between the WAF and the web applications within the first target website, logged in the at least one HAR file, that the first and the second web applications cooperatively or collectively respond to a first interaction with the first target website;
   selectively group, based on determining that the first and the second web applications cooperatively or collectively respond to the first interaction performed on the first target website, the first and the second web applications to form a web application group;
   dynamically determine, based on analyzing the received interaction information, between the WAF and the web applications within the first target website, logged in the at least one HAR file, a second interaction that, when performed by the web application group, causes the first target website to respond in an unintended manner; and
   scan a second target web site by performing the second interaction on the second target website, wherein the second target website is associated with third and fourth web applications, wherein the web scanning computing device being caused to scan the second target website comprises the web scanning computing device being caused to:
      identify the third and the fourth web applications, associated with the second target website, as being similar or substantially the same web applications as at least one of the first and the second web applications associated with the first target website;
      avoid scanning the third and the fourth web applications, associated with the second target website, with the one or more user interactions; and
      avoid scanning the third and the fourth web applications, associated with the second target website, with the second interaction when scanning the second target website, if the first and the second web applications associated with the first target website are identified as already scanned.

28. The non-transitory computer-readable medium of claim 24, wherein the interaction information is associated with one or more interactions or sequences of interactions performed with respect to the first target website by one or more user computing devices.

29. The non-transitory computer-readable medium of claim 24, wherein the web scanner computing device selectively groups the first and the second web applications to form the web application group before dynamically determining the second interaction.

30. The non-transitory computer-readable medium of claim 27, wherein the web scanner computing device receives the interaction information before discovering the first and the second web applications.

31. The non-transitory computer-readable medium of claim 27, wherein the web scanner computing device discovers the first and the second web applications before dynamically determining the second interaction.

32. The non-transitory computer-readable medium of claim 27, wherein the interaction information is received from a plurality of user computing devices.

33. The non-transitory computer-readable medium of claim 16, wherein the interaction information is provided in a secure environment for analysis by the web scanner computing device.

34. The non-transitory computer-readable medium of claim 27, wherein at least one of the first interaction and the second interaction comprises at least one of a user action, a sequence of user actions, and a value.

35. The non-transitory computer-readable medium of claim 27, wherein the receiving the interaction information associated with the first target website is performed continuously, periodically, upon an event occurring, and/or at scheduled times.

36. The non-transitory computer-readable medium of claim 27, wherein the first interaction is customized for the first target website based on the interaction information logged in the at least one HAR file.

37. The non-transitory computer-readable medium of claim 27, wherein the scanning of the second target website is customized based on the second interaction.

* * * * *